(12) United States Patent
Shrestha et al.

(10) Patent No.: US 11,411,609 B1
(45) Date of Patent: Aug. 9, 2022

(54) DATA SHARING IN A POINT-TO-POINT SYSTEM

(71) Applicant: Schweitzer Engineering Laboratories, Inc., Pullman, WA (US)

(72) Inventors: Arun Shrestha, Charlotte, NC (US); Ozan Akyildiz, Pullman, WA (US); Manodev J. Rajasekaran, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/399,796

(22) Filed: Aug. 11, 2021

(51) Int. Cl.
*H04B 3/54* (2006.01)
*H04L 69/324* (2022.01)

(52) U.S. Cl.
CPC ........... *H04B 3/542* (2013.01); *H04L 69/324* (2013.01)

(58) Field of Classification Search
CPC .................. H04L 12/2859; H04L 12/2861
See application file for complete search history.

(56) References Cited

U.S. PATENT DOCUMENTS

| | | | |
|---|---|---|---|
| 10,205,647 B2 | 2/2019 | Yang | |
| 10,270,859 B2 | 4/2019 | Yang | |
| 10,379,991 B2 | 8/2019 | Yang | |
| 10,797,985 B2 | 10/2020 | Yang | |
| 10,859,611 B2 | 12/2020 | Yang | |
| 10,979,330 B2 | 4/2021 | Rajasekaran | |
| 11,050,234 B2 | 6/2021 | Schweitzer, III | |
| 11,258,249 B2 | 2/2022 | Schweitzer, III | |
| 2007/0147415 A1* | 6/2007 | Marusca | H04L 43/0817 340/572.1 |
| 2018/0089057 A1 | 3/2018 | Yang | |
| 2018/0109114 A1 | 4/2018 | Yang | |
| 2018/0212858 A1 | 7/2018 | Yang | |
| 2018/0348267 A1 | 12/2018 | Yang | |
| 2019/0149446 A1 | 5/2019 | Yang | |
| 2020/0112162 A1 | 4/2020 | Rajasekaran | |
| 2021/0057901 A1 | 2/2021 | Schweitzer, III | |

(Continued)

OTHER PUBLICATIONS

IEC 62439-3:2022, Industrial Communications Networks—High availability automation networks—Part 3: Parallel Redundancy Protocol (PRP) and High-availability Seamless Redundancy (HSR). International Standard, Edition 4, Dec. 2021, pp. 1-100, Copyright Danish Standards Association, Feb. 17, 2022.

(Continued)

*Primary Examiner* — Kevin Kim
(74) *Attorney, Agent, or Firm* — Jared L. Cherry

(57) ABSTRACT

The present disclosure pertains to systems and methods to share data in a point-to-point system. In one embodiment, a system to share point-to-point information may be used in an electric power system, and the system may include a communication interface to communicate using a point-to-point protocol using at least a first port and a second port. A point-to-point information sharing subsystem may receive an indication that point-to-point information received on the first port is to be shared on the second port and may configure the second port to share point-to-point information received on the first port. In some embodiments, a delay associated with the communication link may be added to the shared point-to-point information prior to transmission.

20 Claims, 8 Drawing Sheets

(56) References Cited

U.S. PATENT DOCUMENTS

2021/0111555 A1    4/2021    Schweitzer, III

OTHER PUBLICATIONS

IEC 62439-3:2022, Industrial Communications Networks—High availability automation networks—Part 3: Parallel Redundancy Protocol (PRP) and High-availability Seamless Redundancy (HSR). International Standard, Edition 4, Dec. 2021, pp. 101-245, Copyright Danish Standards Association, Feb. 17, 2022.

* cited by examiner

DATA SHARING IN A POINT-TO-POINT SYSTEM

TECHNICAL FIELD

The present disclosure pertains to data sharing connections in point-to-point systems. More particularly, but not exclusively, the systems and methods disclosed herein may be used in connection with electric power systems or other industrial systems. In one specific embodiment, the systems and methods disclosed herein may be used in connection with a Time-Domain Link ("TiDL") merging unit to enhance system reliability and/or reduce device count.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1A:
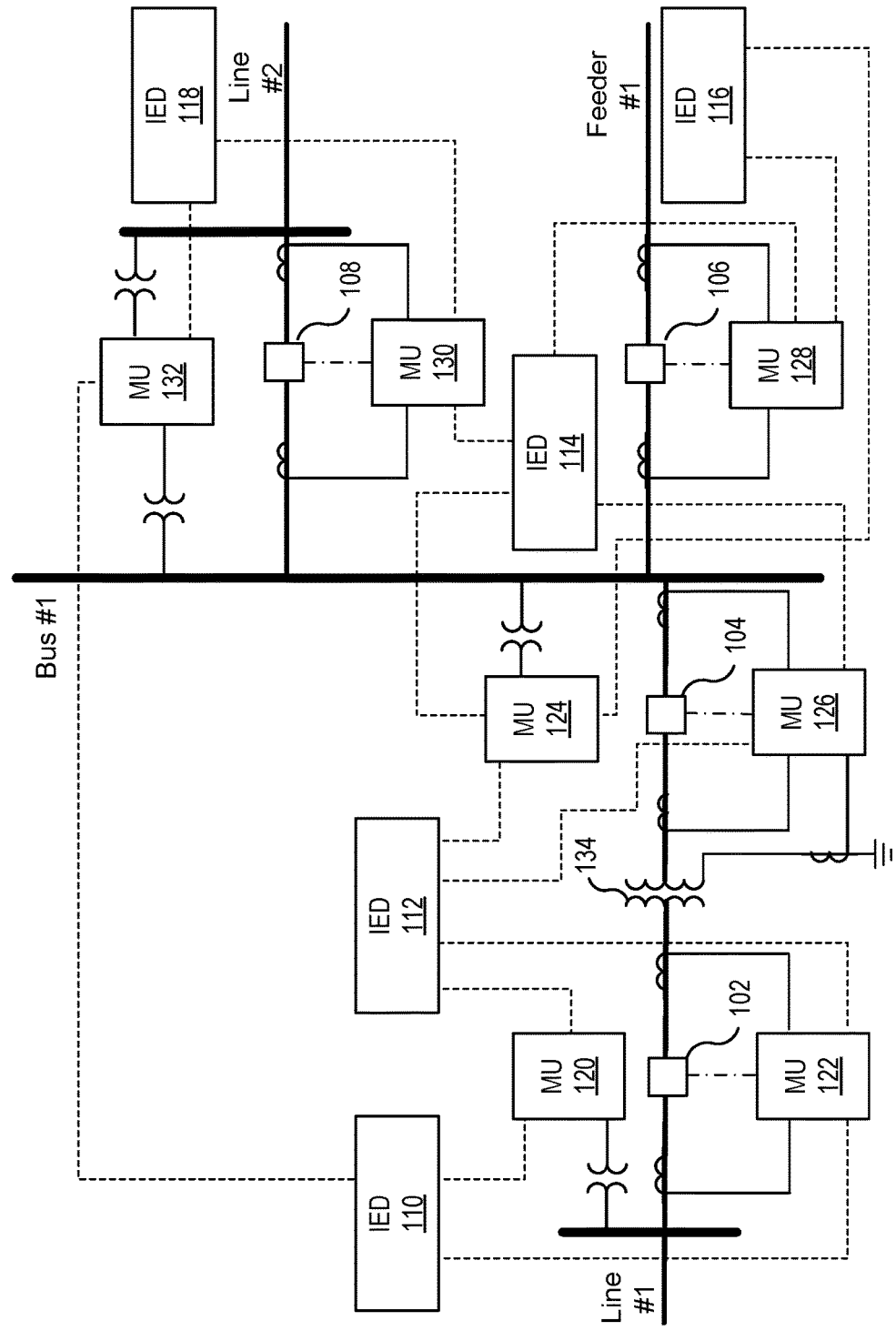
FIG. 1A illustrates a block diagram of a portion of an electric power system consistent with embodiments of the present disclosure.

A point-to-point connection allows communication directly between two devices, and does not natively support routing of information to other devices. Point-to-point communication is commonly used at a data link layer in various industrial systems, including electrical power systems. Some embodiments consistent with the present disclosure may be implemented in connection with merging units. A merging unit measures an analog electrical parameter, digitizes the measurement, and transmits the measurement in a digital format. Merging units may communicate using TiDL, which is a point-to-point protocol. Merging units typically send a stream of information to an Intelligent Electronic Device ("IED").

As used herein, an IED may refer to any microprocessor-based device that monitors, controls, automates, and/or protects monitored equipment within a system. Such devices may include, for example, differential relays, distance relays, directional relays, feeder relays, overcurrent relays, voltage regulator controls, voltage relays, breaker failure relays, generator relays, motor relays, remote terminal units, automation controllers, bay controllers, meters, recloser controls, communication processors, computing platforms, programmable logic controllers (PLCs), programmable automation controllers, input and output modules, and the like. The term IED may be used to describe an individual IED or a system comprising multiple IEDs. Further, IEDs may include sensors (e.g., voltage transformers, current transformers, contact sensors, status sensors, light sensors, tension sensors, etc.) that provide information about the electric power system.

The inventors of the present disclosure have recognized that certain advantages may be realized by sharing data in a point-to-point protocol. Such advantages include, but are not limited to, reducing the number of devices required to implement a desired system architecture and to increase redundancy within a system. Various embodiments consistent with the present disclosure may be used to expand the number of devices with which a merging unit can communicate.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. A module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application-specific integrated circuit (ASIC), PAL, PLA, PLD, field-programmable gate array (FPGA), or any other customizable or programmable device.

FIG. 1A illustrates a block diagram of a portion of an electric power system 100 consistent with embodiments of the present disclosure. Electric power system 100 may represent equipment commonly found in a substation of an electric power system. Power may be supplied by Line #1 and Line #2. Bus #1 connects Line #1 and Line #2 and Feeder #1, which may provide power to electrical loads. A transformer 134 may change the voltage between Line #1 and Bus #1. For example, Line #1 may connect to a high-voltage transmission line, and transformer 134 may step down the voltage to a level suitable for distribution. A plurality of breakers 102, 104, 106, and 108 may selectively interrupt electrical current. Breaker 102 may disconnect electric power system 100 from Line #1. Breakers 102 and 104 may electrically isolate transformer 134. Breaker 108 may disconnect electric power system 100 from Line #2. Breaker 106 may disconnect Feeder #1, thereby cutting off power to loads served by Feeder #1.

Electric power system 100 includes IEDs 110, 112, 114, 116, and 118 that monitor, automate, and protect electric power system 100. Various IEDs may receive analog and binary inputs from a digital secondary system (DSS). DSS technology uses remote data acquisition devices to measure currents and voltages and perform substation control operations. This technology provides flexible solutions, reduces the cost of installing cabling, and improves overall safety in the substation. DSS technology may use various communication protocols, such as the TiDL Protocol ("T-Protocol"), IEC61850-9-2 Sampled Values ("SV"), and other proprietary or open-source protocols.

A plurality of merging units 120, 122, 124, 126, 128, 130, and 132 may sample voltages and/or currents at various locations in electric power system 100 and transmit streams of digitized values to the IEDs 110, 112, 114, 116, and 118. Merging units 120, 122, 124, 126, 128, 130, and 132 may also receive digital signals from other devices. In various embodiments, merging units (MUs) 120, 122, 124, 126, 128, 130, and 132 may communicate with the plurality of IEDs 110, 112, 114, 116, and 118 using multiple point-to-point connections.

IEDs 110, 112, 114, 116, and 118 may be configured to perform specific tasks based on the equipment to which each IED is connected. For example, IED 112 may be embodied as a transformer protection relay, such as a transformer protection relay available from Schweitzer Engineering Laboratories ("SEL") of Pullman, Washington. IED 112 may receive voltage measurements from merging units 120 and 124 and may receive current measurements from merging units 122 and 126. These current and voltage measurements may allow IED 112 to monitor and protect transformer 134 from a variety of conditions that could cause damage. Similarly, IED 114 may be embodied as the bus differential and breaker failure relay from SEL. IED 114 may receive voltage and current measurements from each of merging units 124, 126, 128, and 130.

Each merging unit in electric power system 100 is connected to multiple IEDs, and the IEDs use the measurements made by the merging units to monitor and protect the electric power system equipment in electric power system 100. Operation of electric power system 100 relies on communication among various elements, and undesired operation may occur if communication is disrupted or rerouted.

In system 100, each merging unit is connected to at least two IEDs; however, in actual systems, merging units may be connected to more IEDs. For example, a merging unit may need to provide measurements to more than four IEDs in several specific applications (e.g., three-phase bus voltage in a distribution substation, single-phase synchronizing voltage in a transmission substation, etc.). Merging units have a finite number of connections (e.g., four), and when additional connections are needed, an additional merging unit can be added to communicate with additional relays. This results in additional equipment and expense.

Figure 1B:
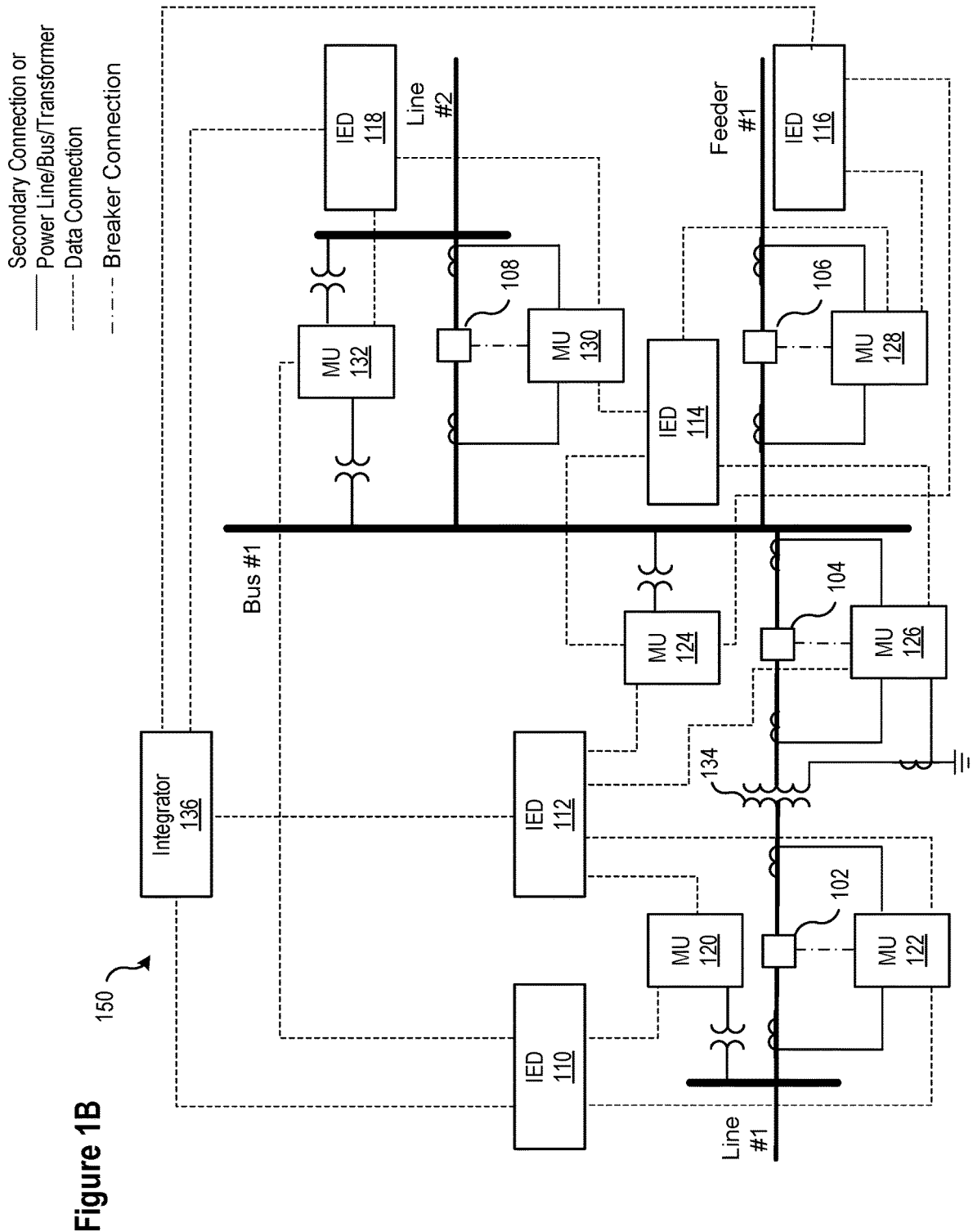
FIG. 1B illustrates a block diagram of a portion of an electric power system including an integrator that may enable data sharing in a point-to-point system consistent with embodiments of the present disclosure.

FIG. 1B illustrates a block diagram of a portion of an electric power system 150 including an integrator 136 that may enable data sharing in a point-to-point system consistent with embodiments of the present disclosure. System 150 may be similar to system 100 illustrated in FIG. 1A, but system 150 includes integrator 136 in communication with IEDs 110, 112, 114, 116, and 118. Integrator 136 may receive information from devices in system 150 and provide such information to other devices or use such information for various applications. Integrator 136 may provide backup protection, communication protection, and other functions. For instance, if any of the communication links between an IED 110, 112, 114, 116, and 118 and a merging unit is lost, integrator 136 may provide backup protection using information routed through other communication links. For example, if the communication link between merging unit 120 and IED 112 fails, but the communication link between merging unit 120 and IED 110 remains active, the information from merging unit 120 may be routed by IED 110 to integrator 136.

Information from merging units 120, 122, 124, 126, 128, 130, and 132 may be routed through IEDS 110, 112, 114, 116, and 118 to integrator 136. Integrator 136 may make information available to other devices that lack a direct data connection. For example, data from merging unit 124, which measures the voltage on Bus #1, may be routed to IED 118 through integrator 136. Using data from merging unit 124, IED 118 may compare the measurements generated by merging unit 132 to measurements from merging unit 124. Further, the availability of data from merging unit 124 and merging unit 132 may provide additional redundancy to system 150. Additional information regarding the backup protection functions that may be performed by integrator 136 is provided in U.S. patent application Ser. No. 16/796,563, titled Equipment Failure Detection in an Electric Power System, and which is incorporated herein by reference. Alternatively, merging unit 132 may be eliminated from system 150 by routing voltage measurements generated by merging unit 124 to IED 118 and IED 110 through integrator 136.

Various connections may be used to share point-to-point information among devices in system 150. For example, point-to-point information may be encapsulated in another format or protocol to enable transmission of the information. In some embodiments, the encapsulated point-to-point information in a routable format (e.g., TCP/IP) that allows for the point-to-point information to be delivered to other devices. Alternatively, the point-to-point data may be routed to an interface that supports point-to-point communications, and the interface may be configured as if the device generating the data is directly connected.

Figure 2:
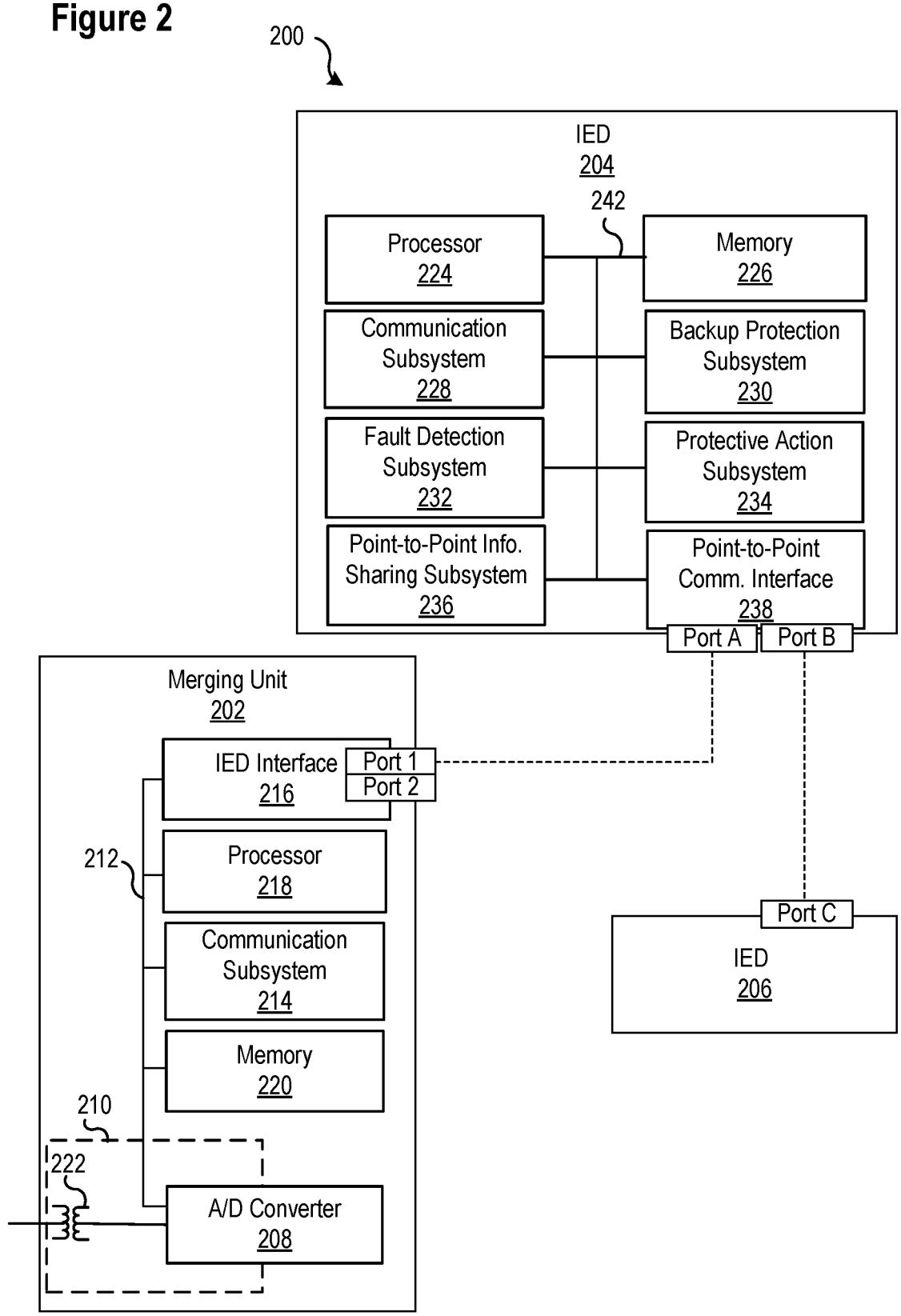
FIG. 2 illustrates a block diagram of a system including a merging unit that provides a stream of data to an intelligent electronic device ("IED") using a point-to-point communication connection, the IED sharing the data with another IED consistent with embodiments of the present disclosure.

FIG. 2 illustrates a block diagram of a system 200 including a merging unit 202 that provides a stream of data to IED 204 using a point-to-point communication connection, and IED 204 shares the data with another IED 206 consistent with embodiments of the present disclosure. Merging unit 202 may generate measurements of electrical conditions (e.g., current, voltage, etc.) and communicate those measurements using a communication link between port 1 of merging unit 202 and port A of IED 204. The communication link between merging unit 202 and IED 204 may comprise a point-to-point communication link. In one specific embodiment, the point-to-point communication link comprises the SEL T-Protocol from Schweitzer Engineering Laboratories of Pullman, Washington. In various embodiments, merging unit 202 may be embodied as one of the merging units illustrated in FIG. 1A and/or FIG. 1B, and IED 204 may be embodied as one of the IEDs illustrated in in FIG. 1A and/or FIG. 1B. System 200 may be implemented using hardware, software, firmware, and/or any combination thereof.

IED 204 may be configured to share data received from merging unit 202 with IED 206 using a communication link between port B of IED 204 and port C of IED 206. IED 204 may be able to make use of data from merging unit 202 while still making the data stream available to IED 206. The ability to share the data stream generated by merging unit 202 with IED 204 and IED 206 may be used to reduce the device count of a system and/or to provide additional redundancy within a system. In some embodiments, IED 204 may include multiple ports, including port B, that can be configured to share point-to-point communications. IED 204 may implement various approaches to ensure that the point-to-point stream of data from merging unit 202 is transparent to IED 206.

Merging unit 202 may acquire current measurements, digitize the measurements, and transmit the measurements in a digital format to IED 204. A sensor subsystem 210 may receive current measurements (I) that are sampled and/or digitized using an analog-to-digital ("A/D") converter 208. In other embodiments, merging unit 202 may monitor other types of signals or parameters. Digitized and/or filtered waveforms corresponding to a current signal may be provided to a data bus 212. A current transformer 222 may include separate signals from each phase of a three-phase electric power system, although only a single phase is illustrated.

Communication subsystem 214 may format communications according to a variety of communication protocols and standards. In one embodiment, communication subsystem 214 may provide a stream of measurements obtained by sensor subsystem 210 in the T-Protocol.

IED interface 216 may allow communication between merging unit 202 and IED 204. IED interface 216 may be in communication with point-to-point communication interface 238. IED interface 216 and point-to-point communication interface 238 may allow for bi-directional communication. For example, merging unit 202 may communicate a stream of measured values, and IED 204 may communicate protective actions (e.g., actuating a breaker) to be implemented by merging unit 202. Point-to-point communication interface 238 may comprise a plurality of ports configured to communicate with a plurality of other devices, although only a single connection is illustrated in FIG. 2.

Processor 218 processes communications received via communication subsystem 214, IED interface 216, and the other subsystems and components in merging unit 202. Processor 218 may operate using any number of processing rates and architectures. Processor 218 may perform various algorithms and calculations described herein. Processor 218 may be embodied as a general-purpose integrated circuit, an application-specific integrated circuit, a field-programmable gate array, and/or any other suitable programmable logic device. Processor 218 may communicate with other elements in merging unit 202 by way of data bus 212.

Memory 220 may comprise any of a variety of transitory and non-transitory computer-readable storage media. Memory 220 may comprise executable instructions to perform processes described herein. Memory 220 may comprise machine-readable media such as, but is not limited to, hard drives, removable media, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. Such electronic instructions may be executed on processor 218.

With regard to IED 204, processor 224 may process communications received via communication subsystem 228, point-to-point communication interface 238, and the other subsystems and components in IED 204. Processor 224 may operate using any number of processing rates and architectures. Processor 224 may perform various algorithms and calculations described herein. Processor 224 may be embodied as a general-purpose integrated circuit, an application-specific integrated circuit, a field-programmable gate array, and/or any other suitable programmable logic device. Processor 224 may communicate with other elements in IED 204 by way of bus 242.

Memory 226 may comprise any of a variety of transitory and non-transitory computer-readable storage media. Memory 226 may comprise executable instructions to perform processes described herein. Memory 226 may comprise machine-readable media such as, but is not limited to, hard drives, removable media, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. Such electronic instructions may be executed on processor 224.

Communication subsystem 228 may format communications according to a variety of communication protocols and standards. In one embodiment, communication subsystem 228 may be configured to receive a stream of measurements from merging unit 202 in the T-Protocol. Communication subsystem 228 may also provide the ability for IED 204 to communicate with other devices via a variety of communication media and communication protocols.

A fault detection subsystem 232 may be configured to analyze measurements or information received from merging unit 202 to identify a fault or other type of anomalous conditions. Faults may comprise a variety of types of conditions, such as an over-current condition, an over-voltage or under-voltage condition, an over-frequency or under-frequency condition, etc.

Protective action subsystem 234 may implement a protective action based on the identification of a fault by fault detection subsystem 232. In various embodiments, a protective action may include tripping a breaker, selectively isolating or disconnecting a portion of the electric power system, etc. Protective action subsystem 234 may coordinate protective actions with other devices in communication with IED 204.

A point-to-point information sharing subsystem 236 may allow a user to configure sharing of point-to-point information. In the illustrated embodiment, point-to-point information sharing subsystem 236 may allow a user to specify that point-to-point data received from merging unit 202 be shared using Port B. As discussed in greater detail below, point-to-point information sharing subsystem 236 may further be configured to determine a link delay associated with sharing point-to-point data and ensuring that the same latency is utilized to maintain synchronization.

Figure 3:
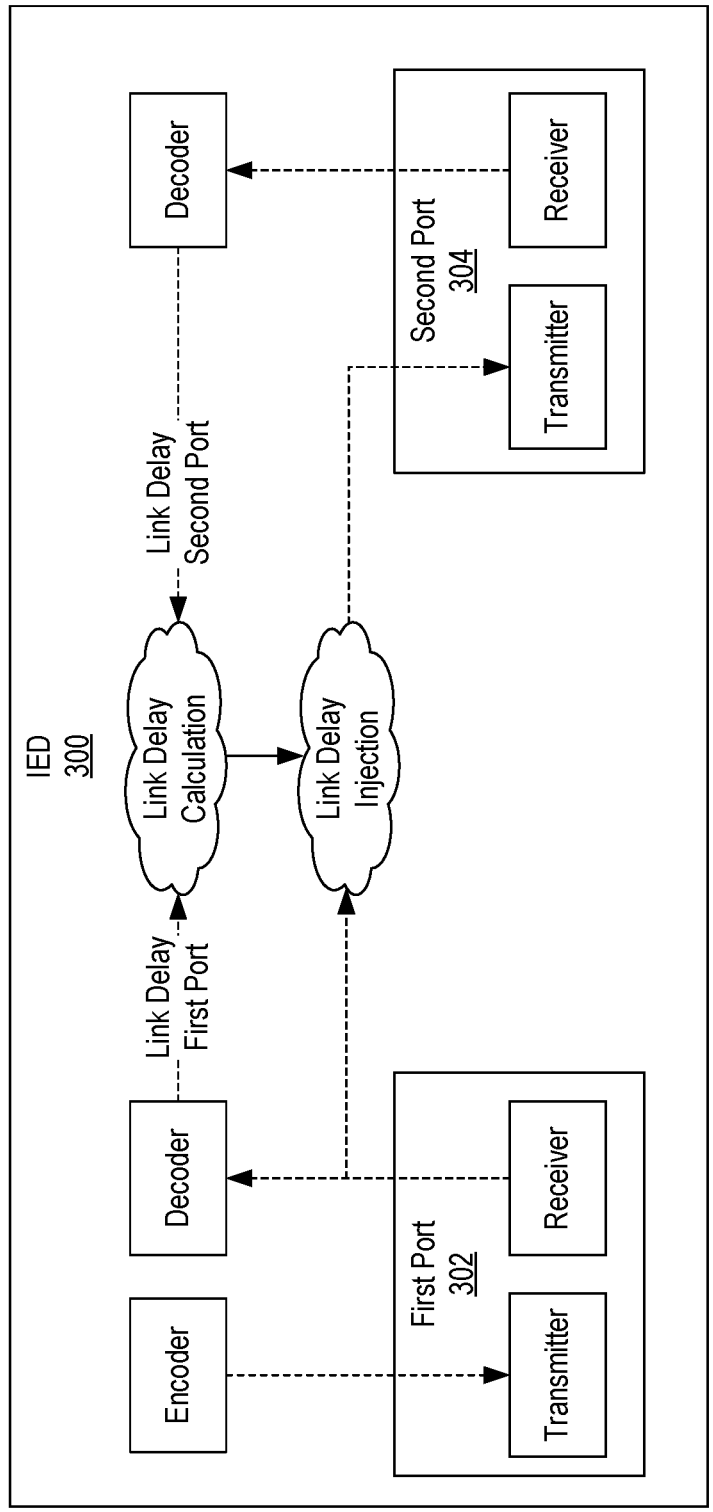
FIG. 3 illustrates a block diagram of an IED for sharing point-to-point communications consistent with embodiments of the present disclosure.

FIG. 3 illustrates a block diagram of an IED 300 for sharing point-to-point communications consistent with embodiments of the present disclosure. IED 300 may be connected to a merging unit (not shown) using a first port 302 and may share information received from the merging unit via a second port 304. A receiving device, such as another IED (not shown) may receive the information shared via second port 304.

IED 300 may account for latency associated with sharing point-to-point communication between first port 302 and second port 304. IED 300 may determine a link delay associated with a receiver and a decoder of both the first port 302 and the second port 304. A link delay associated with the first port 302 and the second port 304 may be calculated by IED 300. The calculated link delay may then be added into communications routed from the first port 302 to the second port 304. For example, if a link delay is determined to be 1 millisecond, a frame received by first port 302 may be sent by the transmitter of the second port 304 with a 1 millisecond link delay value injected in the communication frame. A device connected to the second port may use this information to determine the overall latency and align the data. In some embodiments, information received on the second port 304 that is not used for link delay calculation may be discarded or not be forwarded to other ports (e.g., the first port 302).

Figure 4A:
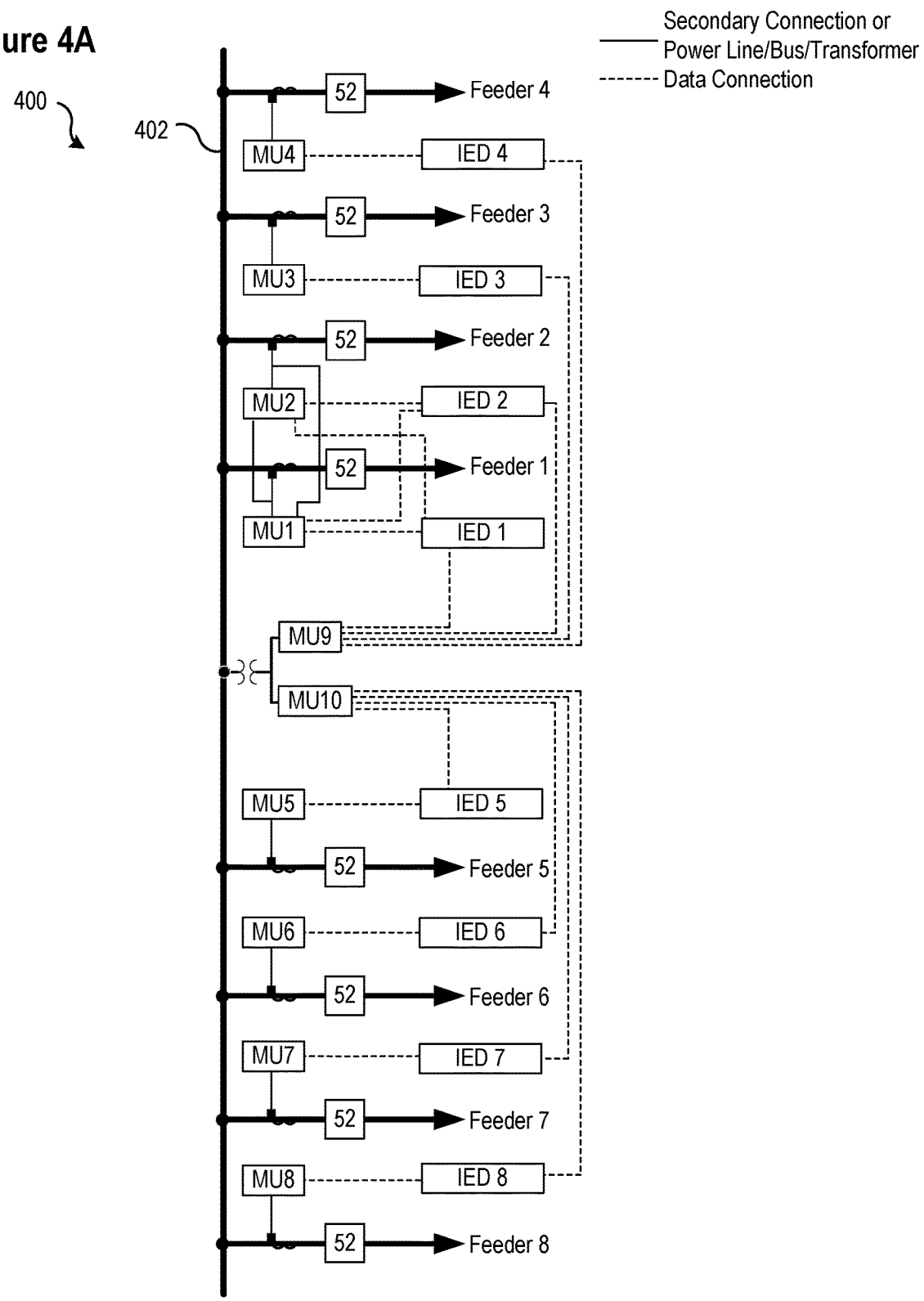
FIG. 4A illustrates a diagram of a low voltage distribution system including a plurality of merging units and a plurality of IEDs consistent with embodiments of the present disclosure.

FIG. 4A illustrates a diagram of a low-voltage distribution system 400 including merging units 1-10 and IEDs 1-8. A bus 402 provides electrical power to feeders 1-8. Each feeder 1-8 is monitored by a merging unit (merging units 1-8) connected to a current transformer. Merging units 9 and 10 monitor the voltage of bus 402 and provide the voltage measurements to IEDs 1-8. Merging unit 9 is connected to IEDs 1-4, and merging unit 10 is connected to IEDs 4-8. The specific configuration of system 400 may be driven, in part, due to the number of connections provided by merging units 9 and 10 to connect to four IEDs. Each IED 1-8 may be on communication with a breaker (ANSI/IEEE Standard Device Number 52) to interrupt a flow of current to a respective feeder.

In the event of a failure of merging unit 9, IEDs 1-4 may lose the ability to provide protection, and similarly, in the event of a failure of merging unit 10, IEDs 5-8 may lose the ability to provide protection. As such, the reliability of system 400 may be improved by providing redundancy for merging units 9 and 10.

Figure 4B:
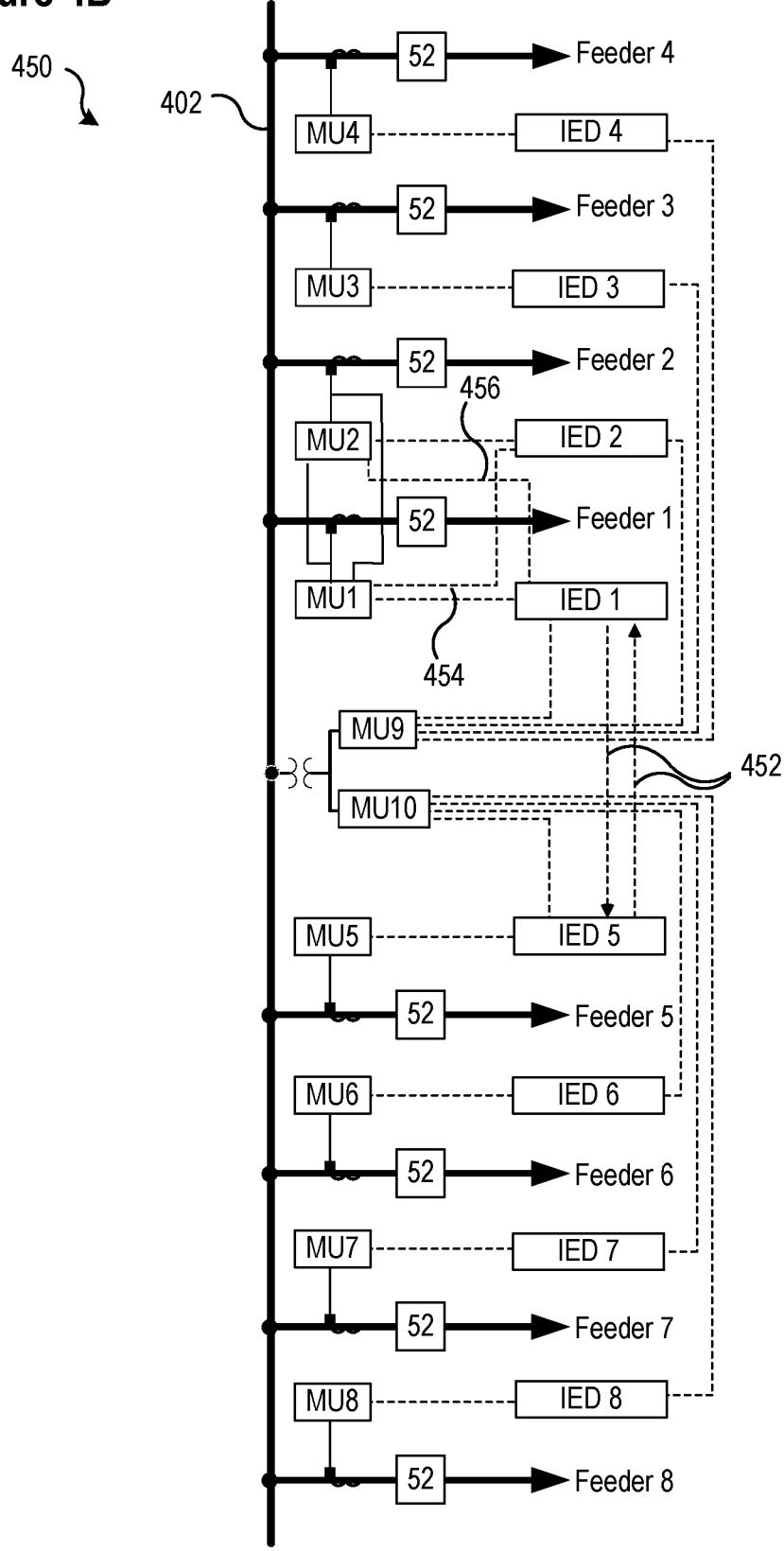
FIG. 4B illustrates a diagram of a low-voltage distribution system including redundancies consistent with embodiments of the present disclosure.

FIG. 4B illustrates a diagram of a low-voltage distribution system 450 including redundancies consistent with embodiments of the present disclosure. System 450 may operate similarly to system 400 illustrated in FIG. 4A. In system 450, IED 1 and IED 5 may exchange point-to-point information using connections 452. In one specific embodiment, connections 452 may transmit voltage information received from merging unit 9 and/or merging unit 10. As such, in the event of a failure of merging unit 9, for example, IED 1 may continue to provide protection functions using information transmitted by merging unit 10 to IED 5, which is then shared with IED 1 via connections 452.

In addition to connections 452, system 450 includes other redundancies. For example, connection 454 connects merging unit 1 to IED 2, which may allow IED 2 to receive current signals related to feeder 1 and provide backup protection in the event of a failure of IED 1. Similarly, connection 456 connects merging unit 2 to IED 1, and may allow IED 1 to receive current signals related to feeder 2. Using the current signals from merging unit 2 and voltage signals from merging unit 9, IED 1 may provide backup protection in the event of a failure of IED 2. Additional redundancies may be implemented in other embodiments that provide protection in the event of failure of various components of system 450. As may be appreciated, sharing of point-to-point information may allow feeder 1 protection to remain enabled despite the loss of merging unit 1 or merging unit 9. Without the ability to share point-to-point information, additional merging units would be required to meet the same level of reliability.

Figure 5:
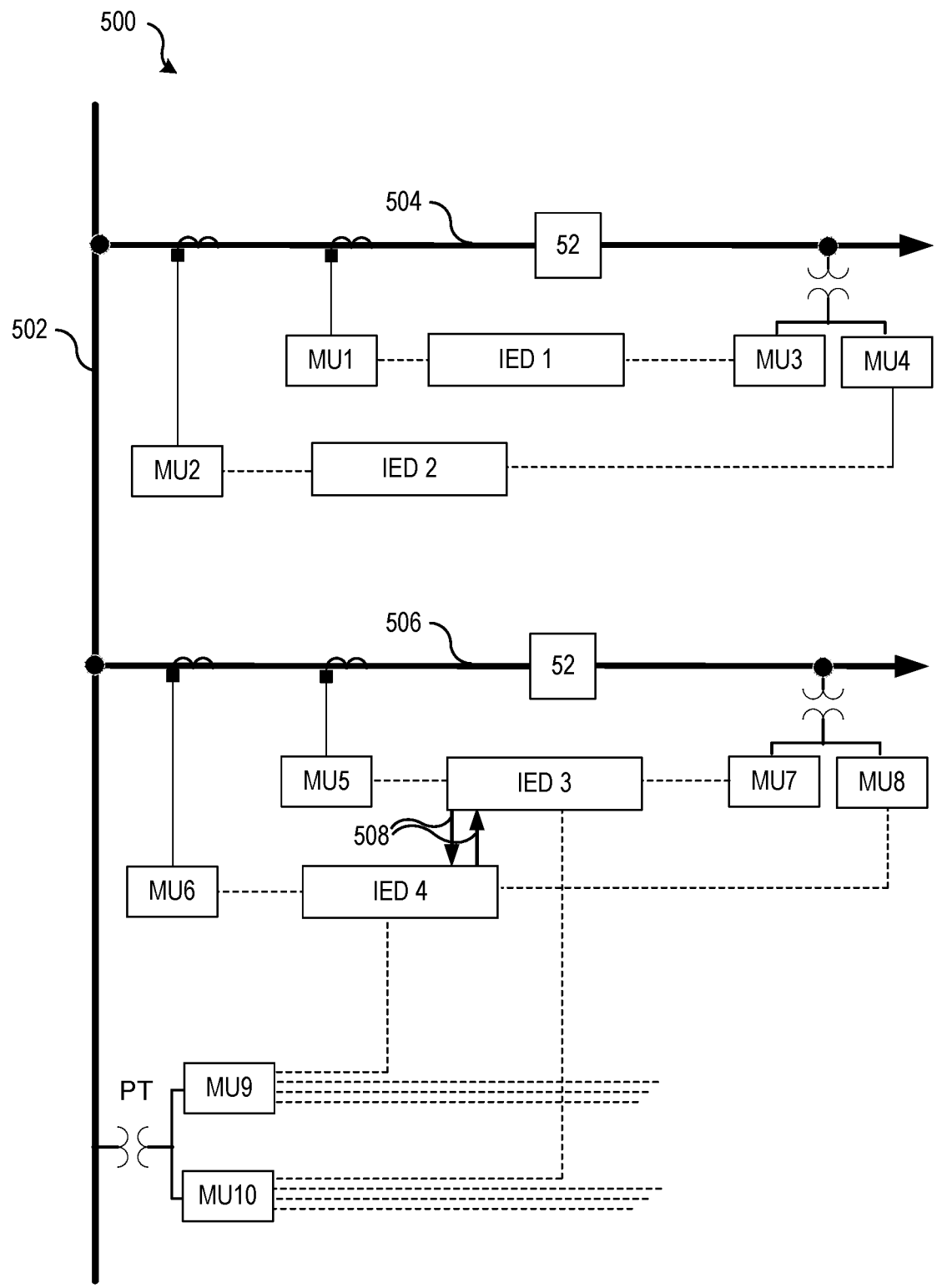
FIG. 5 illustrates a diagram of a high-voltage distribution system including point-to-point data sharing consistent with the present disclosure.

FIG. 5 illustrates a diagram of a high-voltage distribution system 500 including point-to-point data sharing consistent with the present disclosure. A high-voltage bus 502 may supply transmission lines 504 and 506. Current measurements through transmission line 504 may be made by merging unit 1 and merging unit 2. Voltage measurements may be made by merging unit 3 and merging unit 4. IED 1 may receive current measurements from merging unit 1 and voltage measurements from merging unit 3. Similarly, IED 2 may receive current measurements from merging unit 2 and voltage measurements from merging unit 4. IEDs 1 and 2 may control a breaker (ANSI/IEEE Standard Device Number 52) to interrupt a flow of current through transmission line 504. As may be appreciated, the monitoring and protection of line 504 is redundant, such that failure of any single component does not interrupt protection.

Current measurements through transmission line 506 may be made by merging unit 5 and merging unit 6. Voltage measurements may be made by merging unit 7 and merging unit 8. IED 3 may receive current measurements from merging unit 5 and voltage measurements from merging unit 7. Similarly, IED 4 may receive current measurements from merging unit 6 and voltage measurements from merging unit 8. Merging unit 9 may provide voltage measurements from bus 502 to IED 4, and merging unit 10 may provide voltage measurements from bus 502 to IED 3. IEDs 3 and 4 may control a breaker (ANSI/IEEE Standard Device Number 52) to interrupt a flow of current through transmission line 506.

Connections 508 may allow IED 3 and IED 4 to share point-to-point information received from any connected merging unit. The sharing of point-to-point information may provide additional redundancy within system 500 and without requiring additional merging units.

Figure 6:
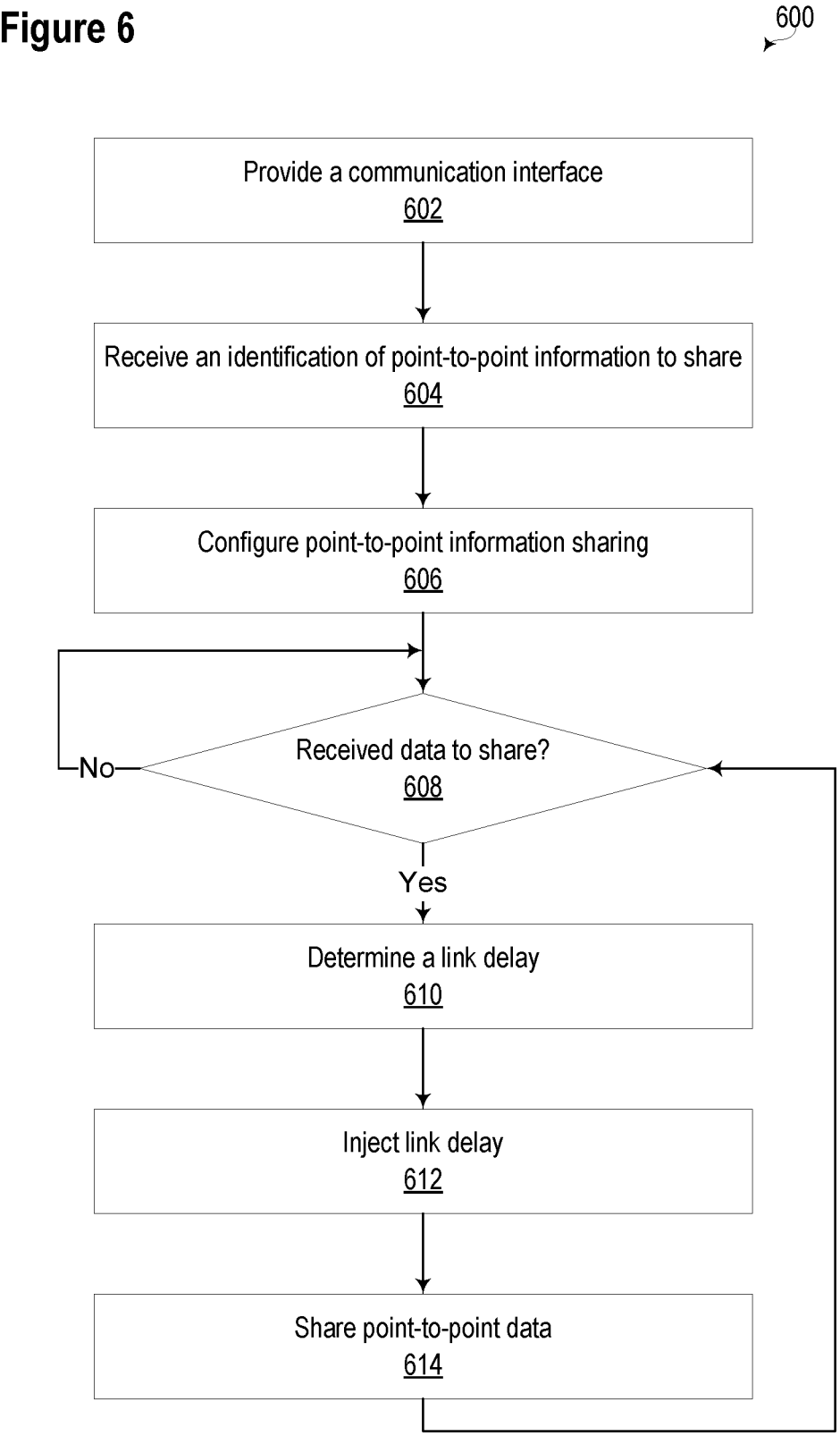
FIG. 6 illustrates a flow chart of a method for sharing point-to-point information in a system consistent with embodiments of the present disclosure.

FIG. 6 illustrates a flow chart of a method 600 for sharing point-to-point information in a system consistent with embodiments of the present disclosure. In various embodiments, method 600 may be used in an electric power system and may be used to share a stream of measurements of electrical parameters. Such a stream of measurements of electrical parameters may be generated by a merging unit or other types of devices.

At 602, a communication interface may be provided. The communication interface may comprise multiple ports used for point-to-point communications. The communication interface may include at least two ports (i.e., a first port to receive point-to-point communication and a second port to share the point-to-point communication received by the first port. In one specific embodiment, the communication interface may be embodied as point-to-point communication interface 238 illustrated in FIG. 2.

At 604, a system implementing method 600 may receive an identification of the point-to-point information to share. In various embodiments, a user may specify a port to receive point-to-point data that is to be shared and a port on which the data is to be shared. This may allow a user to customize the flow of data within the system.

At 606, point-to-point information sharing may be configured. In some embodiments, information received on a single port may be shared on multiple ports. Further, the ability to share data among ports may be dynamic, such that information sharing may be enabled or disabled based on various conditions.

At 608, the system implementing method 600 may determine whether data to share has been received. If no data to share has been received, method 600 may remain at 608, or if data to share has been received, method 600 may proceed to 614.

At 610, a link delay may be determined by the system implementing method 600. Determining a link delay may allow for synchronization of data to be maintained. As illustrated in FIG. 3, a delay associated with point-to-point information received on a first port may be determined.

At 612, a link delay may be injected in the data to be shared. The link delay may correspond to a delay associated with receiving and/or decoding the data. Injection of the link delay may help to maintain synchronization of data within the system.

At 614, the point-to-point data may be shared. In various embodiments, the shared point-to-point data may be used to provide redundant protection, as described in connection with FIG. 4B and FIG. 5. Alternatively, the shared information may be used to reduce the number of merging units or other devices used in a system.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to share point-to-point information in an electric power system, the system comprising:
a communication interface to communicate using a point-to-point protocol, the communication interface comprising at least:
a first port, and
a second port; and
a point-to-point information sharing subsystem to:
receive an indication that point-to-point information received on the first port is to be shared on the second port; and
configure the second port to share point-to-point information received on the first port.

2. The system of claim 1, wherein the first port is configured to communicate with a merging unit in an electric power system.

3. The system of claim 1, wherein the point-to-point information comprises a first stream of measurements of electrical parameters.

4. The system of claim 3, further comprising:
a fault detection subsystem to identify a fault based on the first stream of measurements of electrical parameters; and
a protective action subsystem to generate a protective action based on the fault.

5. The system of claim 4, further comprising a backup protection subsystem to receive a second stream of measurements of electrical parameters from a third port of the communication interface and to provide backup protection in the event of a failure of another device.

6. The system of claim 1, wherein the point-to-point information sharing subsystem is further configured:
to determine a link delay; and
to add the link delay to information shared on the second port prior to transmission.

7. The system of claim 1, wherein information received from the second port is discarded.

8. The system of claim 1, wherein the point-to-point information is routed through an integrator.

9. The system of claim 1, wherein the point-to-point information is encapsulated in a data packet in routable format.

10. The system of claim 1, wherein shared point-to-point information provides added redundancy in the electric power system.

11. A method for sharing point-to-point information in an electric power system, the method comprising:
providing a communication interface to communicate using a point-to-point protocol, the communication interface comprising at least:
a first port, and
a second port;
receiving an identification that the point-to-point information received on the first port is to be shared on the second port; and
configuring the second port to share point-to-point information received on the first port.

12. The method of claim 11, further comprising configuring the first port to communicate with a merging unit in an electric power system.

13. The method of claim 11, wherein the point-to-point information comprises a first stream of measurements of electrical parameters.

14. The method of claim 13, further comprising:
identifying, using a fault detection subsystem, a fault based on the first stream of measurements of electrical parameters; and
implementing a protective action subsystem to generate a protective action based on the fault.

15. The method of claim 14, further comprising:
receiving, using a backup protection subsystem, a second stream of measurements of electrical parameters from a third port of the communication interface and providing backup protection in the event of a failure of another device.

16. The method of claim 11, further comprising:
determining a link delay; and
adding the link delay to information shared on the second port prior to transmission.

17. The method of claim 11, further comprising discarding information received from the second port.

18. The method of claim 11, further comprising routing the point-to-point information through an integrator.

19. The method of claim 11, further comprising encapsulating the point-to-point information in a data packet in routable format.

20. The method of claim 11, further comprising providing added redundancy in the electric power system using the point-to-point information.

* * * * *